US006479710B2

(12) United States Patent
Kishimoto et al.

(10) Patent No.: US 6,479,710 B2
(45) Date of Patent: Nov. 12, 2002

(54) METHOD OF CATALYZING A GAS PHASE REACTION USING AN ACID-BASE CATALYST COMPOSED OF VANADIUM PENTOXIDE HYDRATE

(75) Inventors: Nobuji Kishimoto, Himeji (JP); Etsushige Matsunami, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/267,396

(22) Filed: Mar. 15, 1999

(65) Prior Publication Data

US 2001/0047119 A1 Nov. 29, 2001

Related U.S. Application Data

(63) Continuation of application No. 08/658,178, filed on Jun. 4, 1996, now abandoned.

(30) Foreign Application Priority Data

Jun. 8, 1995 (JP) .............................................. 7-142265

(51) Int. Cl.[7] .......................... C07C 41/00; C07C 45/00; C07C 233/00; C07C 231/00; C07C 69/74

(52) U.S. Cl. ....................... 568/695; 568/694; 568/485; 568/487; 568/338; 568/383; 564/123; 564/133; 564/134; 564/135; 560/1

(58) Field of Search ................................. 562/300, 353; 585/640, 639, 638, 654, 661, 664, 252, 260, 261; 568/309, 310, 338, 383, 376, 403, 426, 443, 449, 450, 485, 487, 694, 695, 664, 667, 627, 671; 560/1, 8, 116, 128, 129, 130; 564/123, 133, 134, 135

(56) References Cited

U.S. PATENT DOCUMENTS

| 2,134,543 | A | | 10/1938 | Andrews ..................... 502/305 |
| 2,409,587 | A | | 10/1946 | Ramage ...................... 502/305 |
| 2,510,803 | A | | 6/1950 | Cooper ....................... 252/464 |
| 3,689,515 | A | | 9/1972 | Smith, Jr. ..................... 502/305 |
| 4,011,278 | A | * | 3/1977 | Plank et al. ................. 260/682 |
| 5,073,360 | A | * | 12/1991 | Kairy et al. ................. 423/608 |
| 5,496,787 | A | | 3/1996 | Hatano et al. .............. 502/305 |

FOREIGN PATENT DOCUMENTS

| DE | 24 08 910 | | 9/1975 |
| DE | 30 06 287 A1 | | 10/1981 |
| EP | 0 350 344 A1 | | 1/1990 |
| EP | 0 582 822 A1 | | 2/1994 |
| EP | 0 747 123 A2 | * | 12/1996 |
| JP | 49-116008 | | 11/1974 |
| JP | 61-293940 A | | 12/1986 |
| JP | 01-224365 A | | 9/1989 |
| JP | 2-44010 | | 2/1990 |
| JP | 05-78130 A | | 3/1993 |
| JP | 06-23043 B2 | | 3/1994 |

OTHER PUBLICATIONS

Ruiz–Hitzky, E. et al.; "Interlayer Adsorption of Ammonia and Pyridine in $V_2O_5$ Xerogel"; *Journal of the Chemical Society*, Faraday Trans. 1; vol. 82, pp. 1597–1604 (1986).

Aldebert et al., "$V_2O_5$ gels; a versatile host structure for intercalation" *Revue de Chimie Minerale*, vol. 19, 1982, pp. 485–495.

Hiroshi Hirashima et al., *Jnl of Japan Ceramics Assn.*, 97 [3] 234–38, 1989, "Synthesis of $V_2O_2$ Gels from Vanadyl Alkoxides.".

N.V. Sidgwick, "The Chemical Elements and Their Compounds", vol. 1. pp. 810–811 (1950).

Kanatzidis et al., "Conductive Polymer Bronzes. Intercalated Polyaniline in $V_2O_5$Xerogels," 111 *J. Am. Chem. Soc.* 4139–4141 (1989).

Handy et al., "Vanadia, Vanadia–Titania, and Vanadia–Titania–Silica Gels . . . ", 134 *Journal of Catalysis* 75–86 (1992).

Kittaka et al., "Thermal Desorption of n–Alchols Intercalated in Vanadium Pentaoxide Hydrate," 89(20) *J. Chem. Soc. Faraday Trans.* 3827–3832 (1993).

Pozarnsky et al., "$^{51}$V NMR and EPR Study of Reaction Kinetics and Mechanisms in $V_2O_5$ . . . " 6 *Chem. Mater.* 380–385 (1994).

* cited by examiner

*Primary Examiner*—Samuel Barts
*Assistant Examiner*—Elvis G. Price
(74) *Attorney, Agent, or Firm*—Kubovcik & Kubovcik

(57) ABSTRACT

A solid acid-base catalyst contains vanadium pentoxide hydrate. Moreover, it is preferable that the vanadium pentoxide hydrate in the solid acid-base catalyst has a composition which is represented by the following general equation (1):

$$V_2O_5 \cdot nH_2O \qquad (1)$$

(n: 0.1–3).

Creation of the vanadium pentoxide hydrate was confirmed by measuring X-ray diffraction spectrum shown in FIG. 1. In accordance with the above arrangement, the solid acid-base catalyst can sufficiently display catalytic activity under mild conditions, and it can be suitably applied to various reactions, such as the syntheses of olefins or ethers through dehydration reactions of alcohols, the syntheses of aldehydes or ketones through dehydrogenation reactions of alcohols, hydrations and isomerization reactions of olefins, alkylations, esterifications, amidations, acetalizations, aminations, hydrogen shift reactions, aldol condensation reactions and polymerization reactions.

8 Claims, 1 Drawing Sheet

METHOD OF CATALYZING A GAS PHASE REACTION USING AN ACID-BASE CATALYST COMPOSED OF VANADIUM PENTOXIDE HYDRATE

This application is a continuation of application Ser. No. 08/658,178, filed Jun. 4, 1996 now abandoned.

FIELD OF THE INVENTION

The present invention relates to a solid acid-base catalyst, which is suitably provided for various reactions, such as syntheses of an olefin (alkene) or an ether through a dehydration reaction of an alcohol, syntheses of an aldehyde or a ketone through a dehydrogenation reaction of an alcohol, hydration and isomerization reactions of olefin, alkylation, esterification, amidation, acetalization, amination, hydrogen shift reactions, aldol condensation reactions and polymerization reactions.

BACKGROUND OF THE INVENTION

Conventionally, many processes using a solid acid catalyst or a solid base catalyst, such as dehydration reactions of alcohols, hydrations and isomerization reactions of olefins, alkylation reactions, esterification reactions and aldol condensation reactions, and polymerization reactions have been studied.

As such a solid acid-base catalyst, a solid acid catalyst, such as zeolite, silica-alumina and titania-silica, and a solid base catalyst, such as magnesium oxide and calcium oxide are known.

However, the above conventional solid acid catalyst and the solid base catalyst have disadvantages that strict reaction conditions such as high temperature and high pressure, etc. are required.

In addition, the above conventional solid acid catalyst also has a disadvantage that its activity is decreased due to deactivation caused by carbon deposition at the time of reaction.

Therefore, it is desired to obtain a solid acid catalyst and a solid base catalyst, which are capable of being prepared easily with excellent reproducibility and of displaying catalytic activity under mild reaction conditions, without deactivation, as well as solid acid-base cooperative catalyst which has both an acid point and a base point, that is peculiar to a solid catalyst, and highly selectively produces reactions through a concerted action of both active points (hereinafter, these catalysts are referred to as solid acid-base catalysts).

SUMMARY OF THE INVENTION

The present invention was invented based upon the above conventional problems, and it is an object of the present invention to provide to provide a new solid acid-base catalyst, which is capable of being prepared easily with excellent reproducibility and is capable of displaying catalytic activity under mild reaction conditions and whose activity is hard to be lowered due to deactivation.

After the provision of a new solid-acid-base catalyst which achieves the above object was studied, we found that a solid acid-base catalyst containing vanadium pentoxide hydrate sufficiently displays catalytic activity under mild conditions for various reactions, such as the syntheses of olefins or ethers through dehydration reactions of alcohols, syntheses of aldehydes or ketones through dehydrogenation reactions of alcohols, hydration and isomerization reactions of olefins, alkylations, esterifications, amidations, acetalizations, aminations, hydrogen shift reactions, aldol condensation reactions and polymerization reactions. Then, the present invention was completed.

In other words, in order to achieve the above object, the solid acid-base catalyst of the present invention is characterized by containing vanadium pentoxide hydrate. In addition, in the above solid acid-base catalyst, it is desirable that the vanadium pentoxide hydrate has a composition which is represented by the following general formula (1):

$$V_2O_5 \cdot nH_2O \quad (1)$$

where n is 0.1–3.

In accordance with the above arrangement, the solid acid-base catalyst can display catalytic activity under mild conditions for various reactions, such as syntheses of olefins or ethers through dehydration reactions of alcohols, syntheses of aldehydes or ketones through dehydrogenation reactions of alcohols, hydrations and isomerization reactions of olefins, alkylations, esterifications, amidations, acetalizations, aminations, hydrogen shift reactions, aldol condensation reactions, and polymerization reactions.

Furthermore, in the above solid acid-base catalyst, it is desirable that the vanadium pentoxide hydrate has a layered structure and is obtained by intercalating at least one kind of substance, which is selected from a group composed of metallic ions, ammonium ions and metal complexes. Moreover, it is desirable that the vanadium pentoxide hydrate has a layered structure and is obtained by intercalating an organic substance between layers. Further, it is desirable that the organic substance is a compound containing nitrogen.

As a result, since the catalytic activity can be further improved by adjusting the acid-base properties of the solid acid-base catalyst, more remarkable catalytic activity can be displayed under mild reaction conditions. Therefore, the solid acid-base catalyst can be suitably applied to various reactions, such as syntheses of olefins or ethers through dehydration reactions of alcohols, syntheses of aldehydes or ketones through dehydrogenation reactions of alcohols, hydrations and isomerization reactions of olefins, alkylations, esterifications, amidations, acetalizations, aminations, hydrogen shift reactions, aldol condensation reactions, and polymerization reactions.

Furthermore, in the solid acid-base catalyst, it is most preferable that the vanadium pentoxide hydrate is obtained such that after ion exchange of a vanadate aqueous solution is made by using a proton-type cation exchange resin, the ion-exchanged solution is polycondensed and is dried. Moreover, it is secondarily preferable that the vanadium pentoxide hydrate is arranged by adding mineral acid to a vanadate aqueous solution or by hydrolyzing vanadyl alkoxide.

As a result, since the solid acid-base catalyst has excellent properties and the catalytic activity can be further improved, a more remarkable catalytic activity can be displayed under mild reaction conditions. Therefore, the solid acid-base catalyst can be suitably applied to various reactions, such as syntheses of olefins or ethers through dehydration reactions of alcohols, syntheses of aldehydes or ketones through dehydrogenation reactions of alcohols, hydrations and isomerization reactions of olefins, alkylations, esterifications, amidations, acetalizations, aminations, hydrogen shift reactions, aldol condensation reactions, and polymerization reactions.

For a fuller understanding of the nature and advantages of the invention, reference should be made to the ensuing detailed description taken in conjunction with the accompanying drawings.

DETAILED DESCRIPTION OF THE PREFERRED EMBODIMENTS

EXAMPLES

Figure 1:
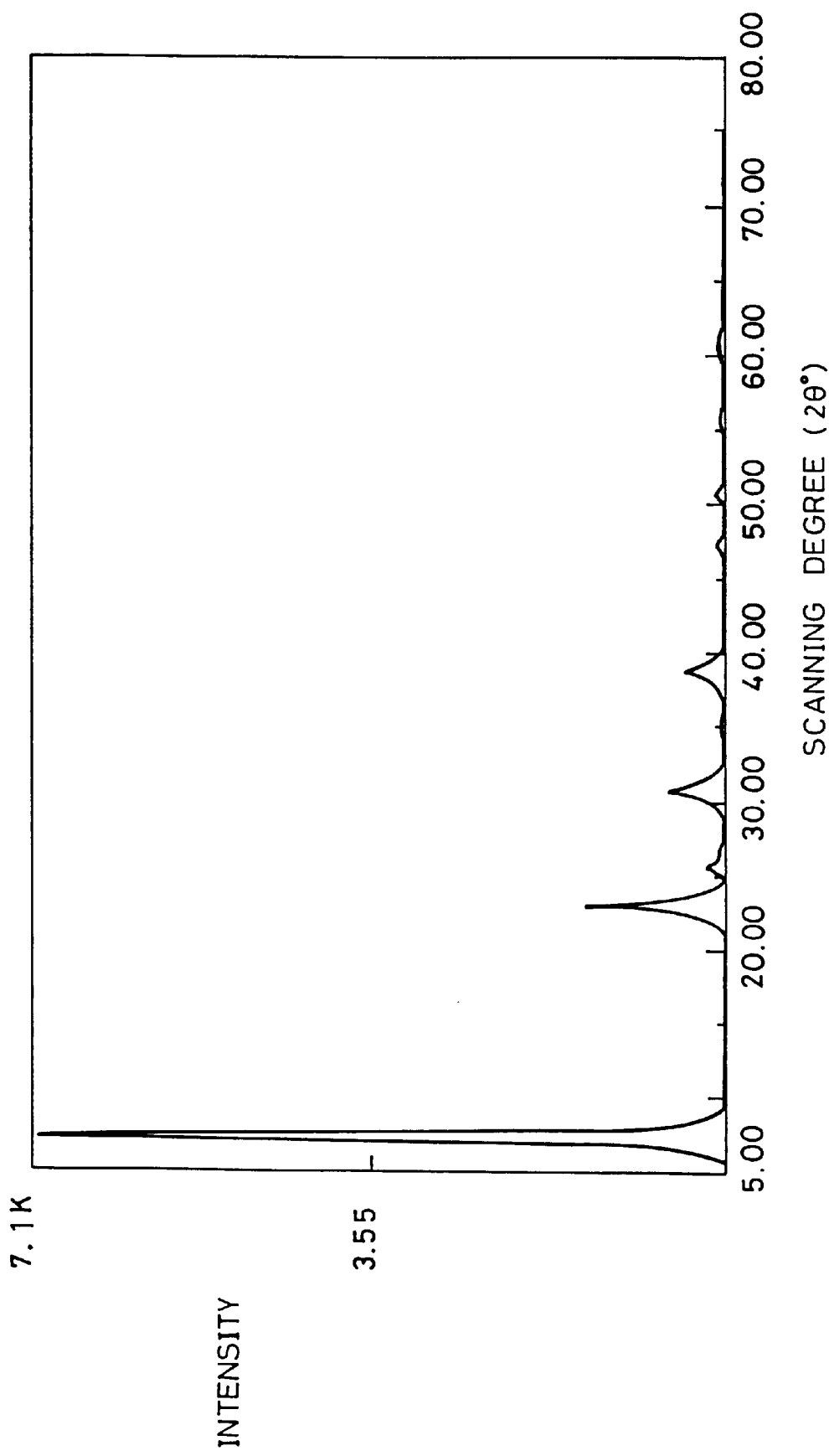
FIG. 1 shows an X-ray diffraction spectrum of a solid acid-base catalyst obtained in one example of the present invention.

The following describes concrete embodiments of the present invention in more detail. In the present invention, a solid acid catalyst, a solid base catalyst and a solid acid-base cooperative catalyst are generically called a solid acid-base catalyst.

A solid acid-base catalyst of the present invention contains vanadium pentoxide hydrate, and it is desirable that such vanadium pentoxide hydrate is contained therein in the form of a xerogel (dry gel) represented by the above-mentioned general formula (1) in respect of easy handling at the time of application to reactions. "n" of the general formula (1) is not particularly limited as long as it is in the range of 0.1–3.

The vanadium pentoxide hydrate of the present invention is different from vanadium pentoxide anhydride, which is widely used as a chief component of catalysts for oxidations and other reactions, in crystal structure and various properties. It is known that vanadium pentoxide anhydride also has acidity but it is very slight acidity, so that a display of its solid acid-base catalytic activity is on an extremely low level compared with the vanadium pentoxide hydrate in the present invention.

The shape of the solid acid-base catalyst is not particularly limited, but in the case where the solid acid-base catalyst is used as a fixed bed, for example, it is desirable that after the solid acid-base catalyst is ground by a ball mill or the like, the powder is molded so as to have a fixed shape according to a shape of a reactor. Moreover, it is desirable that the above molded form is crushed, for example, so as to have a grain diameter of a suitable mesh. Furthermore, the content of the vanadium pentoxide hydrate in the solid acid-base catalyst is not particularly limited.

The solid acid-base catalyst of the present invention can be obtained by various methods. Examples of these methods are a method of treating a vanadate aqueous solution with a proton type cation exchange resin and polycondensing and drying it (i.e., an ion-exchange polymerization method), a method of treating a vanadate aqueous solution with a mineral acid, such as nitric acid, sulfuric acid or hydrochloric acid so as to obtain a precipitate and filtering and drying the precipitate (i.e., a mineral acid treatment), a method of drying a gel which is obtained by hydrolyzing a vanadyl alkoxide, such as vanadyl ethoxide, vanadyl isopropoxide and vanadyl butoxide (i.e., an alkoxide method), and a method of heating $V_2O_5$ at a high temperature and melting it, and rapidly contacting it with water (i.e., a melt quench method).

The vanadium pentoxide hydrate obtained by any of these methods can be used as a solid acid-base catalyst, but in particularly, the ion-exchange polymerization method is preferable.

With the mineral acid treatment, since a solid acid-base catalyst obtained contains a residual group of vanadate and a mineral acid as impurities, a vanadium pentoxide hydrate having constant properties cannot be obtained. Furthermore a filtrate obtained by filtration contains a large amount of vanadium, so that the yield of the vanadium pentoxide hydrate is low.

In addition, with the alkoxide method, vanadyl alkoxide which is a raw material is expensive, and a large amount of organic solvents, such as alcohol, is required. Moreover, the properties of the solid acid-base catalyst obtained under the condition of hydrolyzing gelation are greatly changed, so it is difficult to obtain a solid acid-base catalyst having constant properties.

In addition, with the melt quench method, the yield is extremely low when a general apparatus is used, so it is necessary to use a special and expensive apparatus.

With the ion-exchange polymerization method, since a solid acid-base catalyst having constant properties can be obtained quantitatively with good reproducibility by using a simple apparatus, this method is advantageous for practical usage. Moreover, a proton-type cation exchange resin can be used semipermanently by regenerating it with hydrochloric acid or the like.

The vanadate which is used as a raw material in the ion-exchange polymerization method is not particularly limited, but metavanadate ion is preferable as the vanadate ion (anion), and an alkaline metal ion and/or ammonium ion are preferable as the counter ion (cation). Concrete examples of the above vanadate are ammonium metavanadate, sodium metavanadate and potassium metavanadate.

The proton-type cation exchange resin to be used in the ion-exchange polymerization method is not particularly limited, but a strong acid proton-type cation exchange resin is preferable.

The concentration of the vanadate aqueous solution in the ion-exchange polymerization method is not particularly limited, but as to its lower limit, 0.01 mol/L is preferable, 0.03 mol/L is more preferable and 0.05 mol/L is most preferable as vanadate ion. It is not desirable that the concentration of the vanadate aqueous solution be lower than 0.01 mol/L, because the speed of the polymerization is decreased, and the preparation of the catalyst requires too much time. Moreover, the upper limit represents an amount of melting in water in the saturated state, and for an ammonium metavanadate aqueous solution, the upper limit value is about 0.8 mol/L, and preferably 0.4 mol/L and more preferably 0.2 mol/L.

The treating method when a vanadate aqueous solution is subject to ion exchange using a proton-type cation exchange resin is not particularly limited. As the treating method, for example, the vanadate aqueous solution is dripped or flowed in the proton-type cation exchange resin, and the vanadate aqueous solution is contacted with the proton-type cation exchange resin so as to produce cation exchange. As a result, a proton-type vanadate aqueous solution can be easily obtained. Various treatment conditions, such as treatment time and treatment temperature, are not particularly limited. The above proton-type cation exchange resin can be repeatedly used by regenerating it, for example, with hydrochloric acid or the like.

The reaction conditions under which a vanadate aqueous solution is polycondensed are not particularly limited. After being set aside at room temperature for a long time, for example, the vanadate is naturally polycondensed, but its polymerization speed can be increased by heating. It is preferably that the reaction temperature in the case of heating is not higher than 100° C. The reaction time depends upon the reaction temperature and the concentration of the vanadate aqueous solution, but in the case where it is polycondensed at room temperature, for example, not less than one day is preferable and not less than 7 days is more preferable. Moreover, in the case where the vanadate aqueous solution is polycondensed at 80° C., for example, about 3 hours–4 hours is sufficient. As a result, a sol composed of colloidal particles of polyvanadate can be easily obtained. The polymerization degree of the polycondensation is not particularly limited.

A drying temperature in the above method is not particularly limited, but its upper limit represents a temperature at which the vanadium pentoxide hydrate to be obtained loses crystallization water and undergoes phase transition to $V_2O_5$ (about 350° C.). Therefore, from a viewpoint of stability, a temperature of not higher than 300° C. is preferable and a temperature of not higher than 250° C. is more preferable. The drying may be carried out under normal pressure (atmospheric pressure) or under reduced pressure.

When the vanadium pentoxide hydrate is formed by the above method, a solid acid-base catalyst having constant catalytic activity can be easily obtained with excellent reproducibility.

The solid acid-base catalyst of the present invention displays sufficient catalytic activity under mild reaction conditions for various reactions, such as syntheses of olefins or ethers through dehydration reactions of alcohols, syntheses of aldehydes or ketones through dehydrogenation reactions of alcohols, hydrations and isomerization reactions of olefins, alkylations, esterifications, amidations, acetalizations, aminations, hydrogen shift reactions, aldol condensation reactions, and polymerization reactions. Here, the reactor, which is used for producing various reactions using the solid acid-base catalyst, is not particularly limited, but a fixed-bed flow-type reactor is preferable.

The solid acid-base catalyst of the present invention is particularly suitable as a solid acid catalyst which is used for dehydration of alcohols, dehydrogenation of alcohols, isomerization of olefins, esterification of carboxylic acids with alcohols, etc.

For example, when the solid acid-base catalyst of the present invention is used for the dehydration of an alcohol, a proper ether and/or olefin can be obtained. In the case where isopropyl alcohol is used, for example, diisopropyl ether and propylene are obtained. In the case where t-butyl alcohol and ethyl alcohol are used, ethyl t-butyl ether and isobutene are obtained. Moreover, when the solid acid-base catalyst is used for dehydrogenation of an alcohol, a proper ketone or aldehyde is obtained. Here, the alcohol is not particularly limited. Moreover, the reaction conditions, such as the amount of the solid acid-base catalyst used with respect to the alcohol, are not particularly limited.

In addition, for example, when the solid acid-base catalyst of the present invention is used for an isomerization reaction of an olefin, a proper isomeric compound is obtained. In the case where 1-butene is used, for example, 2-butene is obtained. Here, the olefin is not particularly limited. Moreover, the reaction conditions, such as the amount of the solid acid-base catalyst used with respect to the olefin are not particularly limited.

In addition, when the solid acid-base catalyst of the present invention is used for an esterification reaction of a carboxylic acid with an alcohol, for example, a proper esterified compound is obtained. In the case where acetic acid and ethyl alcohol are used, for example, ethyl acetate is obtained. Here, the carboxylic acid and the alcohol are not particularly limited. Moreover, the reaction conditions, such as usage of the solid acid-base catalyst with respect to the carboxylic acid and the alcohol, are not particularly limited.

The reaction pressure of the above various reactions is not particularly limited. Moreover, the reaction temperature in these reactions is not particularly limited, but its upper limit value represents a temperature at which the vanadium pentoxide hydrate loses water of crystallization and undergoes phase transition to $V_2O_5$ (about 350° C.). Therefore, a temperature of not higher than 300° C. is preferable and not higher than 250° C. is more preferable. The above reaction may be produced under applied pressure or normal pressure (atmospheric pressure) or reduced pressure.

The solid acid-base catalyst of the present invention can be suitably used for various reactions, such as syntheses of olefins or ethers through dehydration reactions of alcohols, syntheses of aldehydes and ketones through dehydrogenation reactions of alcohols, hydration and isomerization reactions of olefins, alkylations, esterifications, amidations, acetalizations, aminations, hydrogen shift reactions, aldol condensation reactions and polymerization reactions.

The solid acid-base catalyst of the present invention may further contain (intercalate) at least one kind of substance, which is selected from a group composed of metal ions, ammonium ions, metal complexes and organic substances as the occasion demands, besides vanadium pentoxide hydrate. The above-mentioned vanadium pentoxide hydrate has a layer structure, and at least one kind of substance, which is selected from the group composed of metal ions, ammonium ions, metal complexes and organic substances (namely, an intercalant), is intercalated between the layers.

As the above intercalant, metal ions are not particularly limited, but concrete examples are $Li^+$, $Na^+$, $K^+$, $Ca^2$, $Mg^{2+}$, $Al^{3+}$, $Cu^{2+}$, $Ag^+$, $Ni^{2+}$, $Co^{3+}$, $Fe^{3+}$ and $La^{3+}$.

As the intercalant, ammonium ions are not limited to $NH_4^+$, but they may be (alkyl) ammonium ions represented by the following general formula:

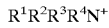

$$R^1R^2R^3R^4N^+$$

(in the formula, $R^1$, $R^2$, $R^3$, $R^4$ each independently represent hydrogen or an alkyl group).

As the intercalant, metal complexes are not particularly limited, but concretely, metallocene, bipyridyl complex or the like which is a transition metal can be used.

As the intercalant, organic substances are not particularly limited. A compound containing nitrogen is preferable. Concrete examples of such a compound containing nitrogen are aniline, pyridine, bipyridine, viologen and pyrazine, but the organic substance is not particularly limited to them.

The content of the intercalant in the solid acid-base catalyst is not particularly limited, but it is preferable that a molar ratio of the intercalant to V (intercalant/V) is in the range of 0.01–8, and it is more preferable that the molar ration is in the range of 0.1–5.

In addition, the intercalant may be one kind of substance, which is selected from metal ions, ammonium ions, metal complexes and organic substances, or a plurality of them may be combined.

The method of intercalating at least one kind of substance, which is selected from the group composed of metal ions, ammonium ions, metal complexes and organic substances, between the layers of the vanadium pentoxide hydrate as the intercalant is not particularly limited. For example, after a powder of a xerogel of a vanadium pentoxide hydrate is soaked into a solution including an intercalant, it may be dried. Moreover, after a hydrogel or a hydrosol of the vanadium pentoxide hydrate is mixed with a solution including an intercalant, it can be dried. Further, after salts, metal complexes or organic substances containing metal ions or ammonium ions are directly mixed with a hydrogel or hydrosol of the vanadium pentoxide hydrate, it can be dried.

In order to obtain the solid acid-base catalyst where at least one kind of substance, which is selected from the group composed of metal ions, ammonium ions, metal complexes and organic substances, is intercalated, the above-mentioned drying may be carried out in the same manner as that of the case where intercalation is not carried out. The drying temperature is not particularly limited as long as it is not higher than a temperature (about 350° C.) at which vanadium pentoxide hydrate to be obtained loses water of crystallization and undergoes phase transition to $V_2O_5$. Therefore, the temperature can be determined based upon a type of intercalant to be used, but from a viewpoint of stability, a temperature of not higher than 300° C. is preferable and not higher than 250° C. is more preferable. The above drying may be carried out under normal pressure (atmospheric pressure) or reduced pressure.

In accordance with the above methods, when the vanadium pentoxide hydrate is formed at least one kind of substance, which is selected from the group composed of metal ions, ammonium ions, metal complexes and organic substances, is intercalated between the layers of the vanadium pentoxide hydrate with a layered structure, a solid acid-base catalyst having constant catalytic activity can be easily obtained with excellent reproducibility. Furthermore, when an intercalant is selected, the acid-base properties of the solid acid-base catalyst can be adjusted.

The solid acid-base catalyst sufficiently displays catalytic activity under mild reaction conditions for various reactions, such as syntheses of olefins or ethers through dehydration reactions of alcohols, syntheses of aldehydes or ketones through dehydrogenation reactions of alcohols, hydrations and isomerization reactions of olefins, alkylations, esterifications, amidations, acetalizations, aminations, hydrogen shift reactions, aldol condensation reactions and polymerization reactions. Here, the reactor which is used for producing the reactions using the solid acid-base catalyst is not particularly limited, although a fixed bed flow-type reactor is preferable.

When the solid acid-base catalyst in which the intercalant is intercalated between the layers of the vanadium pentoxide hydrate with the layer structure is used for the dehydration and dehydrogenation reactions of alcohols, for example, not only proper ethers and/or olefins but also proper ketones or aldehydes are obtained. In the case where $Cu^{2+}$, $Na^+$, $K^+$, $Mg^{2+}$, $Ca^{2+}$ or $Al^{3+}$ is used as the intercalant and isopropyl alcohol is used as the alcohol, for example, not only diisopropyl ether and propylene but also acetone are obtained. Moreover, in the case where pyridine is used as the intercalant and isopropyl alcohol is used as the alcohol, for example, only propylene and acetone are selectively obtained. Here, the alcohol is not particularly limited. Furthermore, the reaction conditions, such as the amount of the solid acid-base catalyst used with respect to the alcohol are not particularly limited.

The reaction pressure is not particularly limited. Moreover, the reaction temperature is not particularly limited, but its upper limit value represents a temperature at which the vanadium pentoxide hydrate loses water of crystallization and undergoes phase transition to $V_2O_5$ (about 350° C.), so a temperature not higher than 300° C. is preferable and not higher than 250° C. is more preferable. The above reactions may be produced under applied pressure, normal pressure (atmospheric pressure) or reduced pressure.

When at least one kind of substance, which is selected from the group composed of metal ions, ammonium ions, metal complexes and organic substances, is intercalated between the layers of the vanadium pentoxide hydrate with the layer structure, the catalytic activity of the solid acid-base catalyst of the present invention can be further improved. Therefore, the solid acid-base catalyst of the present invention can be suitably used for various reactions, such as syntheses of olefins or ethers through hydration reactions of alcohols, syntheses of aldehydes or ketones through dehydrogenation reactions of alcohols, hydrations and isomerization reactions of olefins, alkylations, esterifications, amidations, acetalizations, aminations, hydrogen shift reactions, aldol condensation reactions and polymerization reactions.

The following concretely describes the present invention through examples, but the present invention is not necessarily limited to the examples.

EXAMPLE 1

An ammonium metavanadate aqueous solution (concentration: 0.1 mol/L) as a vanadate aqueous solution was let into a column of a proton-type cation exchange resin (made by The Dow Chemical Co., DOWEX "registered trademark", 50W-X4, 50 mesh-100 mesh), and ions were exchanged therein so that a proton-type vanadate aqueous solution was prepared. Thereafter, this vanadate aqueous solution was set aside for two weeks at room temperature so that the vanadic acid polymerized spontaneously, and dark red polyvanadic acid sol was obtained.

Next, the polyvanadic acid sol was dried in air at 120° C. for one whole day and night, and then calcined in air at 250° C. for two hours so that a blackish brown xerogel was obtained. Successively, after the xerogel was ground for 10 minutes by a ball mill and the obtained powder was press molded, its grain size was made uniform to 9 mesh-16 mesh so that a solid acid-base catalyst was obtained.

As to the solid acid-base catalyst obtained in the above method, an X-ray diffraction spectrum was measured, and its substance was identified. As a result, it was confirmed that the solid acid-base catalyst contains vanadium pentoxide hydrate represented by the general equation (1). Moreover, it was confirmed that the vanadium pentoxide hydrate had a layer crystal structure in which an interlayer spacing was 11.5 Å in air at room temperature and that "n" of the general equation (1) was 1.6. The X-ray diffraction spectrum is shown in FIG. 1.

Next, the following various reactions were conducted by using the above-mentioned solid acid-base catalyst.

First, an ether was synthesized through a dehydration reaction of an alcohol. Namely, in order to conduct the reaction using a fixed bed flow method, 1.0 g of the solid acid-base catalyst was charged into a reactor constructed of stainless steel with an internal diameter of 10 mm. Then, a mixed gas, which was obtained by mixing t butyl alcohol, ethyl alcohol and helium so that the molar ratio became 1:1:15 was passed through the reactor at a speed of 64 ml/min. The reaction conditions were normal pressure and a temperature of 90° C.

The mixed gas, which had passed through the reactor for 15 minutes immediately after the start of the reaction, was sampled, and its product was analyzed by gas chromatography. As a result, conversion of the t-butyl alcohol was 28.2% and conversion of the ethyl alcohol was 16.0%. Moreover, the selectivity of ethyl t-butyl ether, which is a product, was 44.3% on a basis of the t-butyl alcohol and 78.1% on a basis of the ethyl alcohol. Further, the selectivity of isobutene which is a product was 35.7%.

Next, dehydration and dehydrogenation reactions of an alcohol were conducted. Namely, 1.2 g of the solid acid-base catalyst was charged into a reactor which is similar to the above-mentioned one. Then, a mixed gas, which was obtained by mixing isopropyl alcohol and helium so that the molar ratio became 1:7.3, was passed through the reactor at a speed of 64 ml/min. The reaction conditions were normal pressure and a temperature of 160° C.

The mixed gas, which had passed through the reactor for 15 minutes immediately after the start of the reaction, was sampled, and its product was analyzed by gas chromatography. As a result, conversion of the isopropyl alcohol was 73.7%. Moreover, the selectivity of propylene, diisopropyl ether and acetone, which are products, was respectively 47.3%, 37.1% and 10.6%.

Next, an isomerization reaction of an olefin was conducted. Namely, 1.2 g of the solid acid-base catalyst was charged into a reactor which is similar to the above one. Then, a mixed gas, which was obtained by mixing 1-butene and helium so that the molar ratio became 1:10.5, was passed through the reactor at a speed of 46 ml/min. The reaction conditions were normal pressure and a temperature of 160° C.

The mixed gas, which had passed through the reactor for 15 minutes immediately after the start of the reaction, was sampled, and its product was analyzed by gas chromatography. As a result, conversion of the 1-butene was 12.6%. Moreover, the selectivity of cis-2-butene and trans-2-butene, which are products, was respectively 60.5% and 39.5%.

Next, an esterification reaction was conducted. Namely, 1.2 g of the solid acid-base catalyst was charged into a reactor which is similar to the above one. Then, a mixed gas, which was obtained by mixing acetic acid, ethyl alcohol and helium so that the molar ratio became 1:1.7:12.7, was passed through the reactor at a speed of 65 ml/min. The reaction conditions were normal pressure and a temperature of 140° C.

The mixed gas, which had passed through the reactor for 15 minutes immediately after the start of the reaction, was sampled, and its product was analyzed by gas chromatography. As a result, conversion of the acetic acid was 16.6%, and conversion of the ethyl alcohol was 17.5%. Moreover, the selectivity of ethyl acetate, which is a product, was 85.5% on a basis of the acetic acid and 47.7% on a basis of the ethyl alcohol.

EXAMPLE 2

The polyvanadic acid sol obtained in example 1 was dried at 200° C. so that a blackish brown xerogel was obtained. Then, after the xerogel was ground for 10 minutes by a ball mill, the resultant powder was press molded so that a grain size was made uniform to 9 mesh -16 mesh and a solid acid-base catalyst was obtained.

As to the solid acid-base catalyst obtained in the above method, when an X-ray diffraction spectrum was measured, the spectrum was completely the same as the X-ray diffraction spectrum of the solid acid-base catalyst in example 1 and shown in FIG. 1. Namely, it was confirmed that the solid acid-base catalyst contains vanadium pentoxide hydrate represented by the general equation (1). Moreover, it was confirmed that the vanadium pentoxide hydrate had a layer crystal structure in which an interlayer spacing was 11.5 Å in air at room temperature and that "n" of the general equation (1) was 1.6.

Next, dehydration and dehydrogenation reactions of isopropyl alcohol were conducted by using the above-mentioned solid acid-base catalyst in the presence of oxygen.

Namely, 1.0 g of the solid acid-base catalyst was charged into a reactor which is similar to that used in example 1. Then, a mixed gas, which was obtained by mixing isopropyl alcohol, oxygen and helium so that the molar ratio became 1:1:6.25 was passed through the reactor at a speed of 64 ml/min. The reaction conditions were normal pressure and a temperature of 140° C.

The mixed gas, which had passed through the reactor for 15 minutes immediately after the starting of the reaction, was sampled, and its product was analyzed by gas chromatography. As a result, conversion of the isopropyl alcohol was 37.5%. Moreover, the selectivity of propylene, diisopropyl ether and acetone, which are products, was respectively 51.1%, 32.2% and 14.5%.

EXAMPLE 3

5 g of the powder obtained from the vanadium pentoxide hydrate in example 1 was soaked in 125 mL of acetonitrile solution mixed with pyridine (pyridine concentration: 0.1 ml/L), at room temperature for 2 days. Then, after it was filtered so that the powder was separated from the liquid and the powder was rinsed by acetonitrile, the powder was dried at 200° C. The obtained powder was press molded, and its grain size was made uniform to 9 mesh-16 mesh so that a solid acid-base catalyst was obtained.

As to the solid acid-base catalyst obtained in the above method, when its X-ray diffraction spectrum was measured, it was confirmed that its diffraction pattern was completely the same as the diffraction pattern of the vanadium pentoxide hydrate which was obtained in example 1 and shown in FIG. 1 and that its layer crystal structure was maintained. Moreover, it was confirmed that a peak position of the X-ray diffraction spectrum of the solid acid-base catalyst was shifted from the peak position of the X-ray diffraction spectrum of the vanadium pentoxide hydrate, which was obtained in example 1 and shown in FIG. 1, and that the interlayer spacing of the layer crystal structure was changed to 13.0 Å. As a result, it was confirmed that pyridine was intercalated between the layers of the vanadium pentoxide hydrate having the layer crystal structure. As a result of elementary analysis, the molar ratio of the intercalated pyridine was 0.61 with respect to V.

Next, dehydration and dehydrogenation reactions of isopropyl alcohol were conducted in the presence of oxygen by using the solid acid-base catalyst.

Namely, 1.0 g of the solid acid-base catalyst was charged into a reactor which is similar to the reactor used in example 1. Then, a mixed gas, which was obtained by mixing isopropyl alcohol, oxygen and helium so that the molar ratio became 1:1:6.25, was passed through the reactor at a speed of 64 ml/min. The reaction conditions were normal pressure and a temperature of 140° C.

The mixed gas, which had passed through the reactor for 15 minutes immediately after the start of the reaction, was sampled, and its products were analyzed by gas chromatography. As a result, conversion of the isopropyl alcohol was 55.4%. Moreover, the selectivity of acetone and propylene, which are products, was respectively 44.4% and 39.6%. Further, at this time, diisopropyl ether was not formed.

EXAMPLE 4

The polyvanadic acid sol of example 1 was diluted with water, and 2.5 liters of a liquid whose concentration as vanadium ion was 0.03 mol/L was obtained. 300 mL of water, in which 18.12 g of $Cu(NO_3)_2 \cdot 3H_2O$ was dissolved, was added to the solution, and it was agitated at room temperature for 1 hour. After a formed brown precipitate was filtered, and agitation and rinsing of the precipitate for 30 minutes using 2 liters of water were repeated twice, the precipitate was dried at 200° C. Then, after the precipitate was ground for 10 minutes by a ball mill and the resultant powder was press molded, its grain size was made uniform to 9 mesh-16 mesh so that a solid acid-base catalyst was obtained.

As to the solid acid-base catalyst obtained in the above manner, when its X-ray diffraction spectrum was measured, it was confirmed that its diffraction pattern was completely the same as the diffraction pattern of the vanadium pentoxide hydrate which was obtained in example 1 and shown in FIG. 1 and that its layer crystal structure was maintained. Moreover, it was confirmed that a peak position of the X-ray diffraction spectrum of the solid acid-base catalyst was shifted from the peak position of the X-ray diffraction spectrum of the vanadium pentoxide hydrate, which was obtained in example 1 and shown in FIG. 1, and that the interlayer spacing of the layer crystal structure was changed to 11.3 Å. As a result, it was confirmed that $Cu^{2+}$ was intercalated between the layers of the vanadium pentoxide hydrate having the layer crystal structure. As a result of elementary analysis, the molar ratio of the intercalated $Cu^{2+}$ was 0.59 with respect to V.

Next, the dehydration and dehydrogenation reactions of isopropyl alcohol were conducted in the presence of oxygen by using the solid acid-base catalyst.

Namely, 1.0 g of the solid acid-base catalyst was charged into a reactor which is similar to the reactor used in example 1. Then, mixed gas, which was obtained by mixing isopropyl alcohol, oxygen and helium so that the molar ratio became 1:1:6.25, was passed through the reactor at a speed of 64 ml/min. The reaction conditions were normal pressure and a temperature of 140° C.

The mixed gas, which had passed through the reactor for 15 minutes immediately after the start of the reaction, was sampled, and products were analyzed by gas chromatography. As a result, conversion of the isopropyl alcohol was 50.7%. Moreover, the selectivity of propylene, diisopropyl ether and acetone, which are products, was respectively 49.6%, 28.8% and 15.2%.

EXAMPLE 5

The polyvanadic acid sol of example 1 was diluted with water, and 2.5 liters of a liquid whose concentration as vanadium ion was 0.03 mol/L was obtained. 300 mL of water, in which 31.87 g of $NaNO_3$ was dissolved, was added to the liquid, and it was agitated at room temperature for 1 hour. After a formed brown precipitate was filtered, and agitation and rinsing of the precipitate for 30 minutes using 2 liters of water were repeated twice, the precipitate was dried at 200° C. Then, after the precipitate was ground for 10 minutes by a ball mill and the resultant powder was press molded, its grain size was made uniform to 9 mesh-16 mesh so that a solid acid-base catalyst was obtained.

As to the solid acid-base catalyst obtained in the above method, when its X-ray diffraction spectrum was measured, it was confirmed that its diffraction pattern was completely the same as the diffraction pattern of the vanadium pentoxide hydrate which was obtained in example 1 and shown in FIG. 1 and that its layer crystal structure was maintained. Moreover, it was confirmed that a peak position of the X-ray diffraction spectrum of the solid acid-base catalyst was shifted from the peak position of the X-ray diffraction spectrum of the vanadium pentoxide hydrate, which was obtained in example 1 and shown in FIG. 1, and that the interlayer spacing of the layer crystal structure was changed to 11.1 Å. As a result, it was confirmed that the $Na^+$ was intercalated between the layers of the vanadium pentoxide hydrate having the layer crystal structure. As a result of elementary analysis, the molar ratio of the intercalated $Na^+$ was 1.24 with respect to V.

Next, the dehydration and dehydrogenation reactions of isopropyl alcohol were conducted in the presence of oxygen by using the solid acid-base catalyst.

Namely, 1.0 g of the solid acid-base catalyst was charged into a reactor which is similar to the reactor used in example 1. Then, a mixed gas, which was obtained by mixing isopropyl alcohol, oxygen and, helium so that the molar ratio became 1:1:6.25, was passed through the reactor at a speed of 64 ml/min. The reaction conditions were normal pressure and a temperature of 140° C.

The mixed gas, which had passed through the reactor for 15 minutes immediately after the start of the reaction, was sampled, and products were analyzed by gas chromatography. As a result, conversion of the isopropyl alcohol was 21.1%. Moreover, the selectivity of propylene, diisopropyl ether and acetone, which are products, was respectively 44.1 %, 33.6 % and 17.8%.

EXAMPLE 6

The polyvanadic acid sol of example 1 was diluted with water, and 2.5 liters of a liquid whose concentration as vanadium ion was 0.03 mol/L was obtained. 300 mL of water, in which 37.90 g of $KNO_3$ was dissolved, was added to the liquid, and it was agitated at room temperature for 1 hour. After a formed brown precipitate was filtered, and agitation and rinsing of the precipitate for 30 minutes using 2 liters of water were repeated twice, the precipitate was dried at 200° C. Then, after the precipitate was ground for 10 minutes by a ball mill and the resultant powder was press molded, its grain size was made uniform to 9 mesh-16 mesh so that a solid acid-base catalyst was obtained.

As to the solid acid-base catalyst obtained in the above manner, when its X-ray diffraction spectrum was measured, it was confirmed that its diffraction pattern was completely the same as the diffraction pattern of the vanadium pentoxide hydrate which was obtained in example 1 and shown in FIG. 1 and that its layer crystal structure was maintained. Moreover, it was confirmed that a peak position of the X-ray diffraction spectrum of the solid acid-base catalyst was shifted from the peak position of the X-ray diffraction spectrum of the vanadium pentoxide hydrate, which was obtained in example 1 and shown in FIG. 1, and that the interlayer spacing of the layer crystal structure was changed to 10.9 Å. As a result, it was confirmed that the $K^+$ was intercalated between the layers of the vanadium pentoxide hydrate having the layer crystal structure. As a result of elementary analysis, the molar ratio of the intercalated $K^+$ was 0.41 with respect to V.

Next, the dehydration and dehydrogenation reactions of isopropyl alcohol were conducted in the presence of oxygen by using the solid acid-base catalyst.

Namely, 1.0 g of the solid acid-base catalyst was charged into a reactor which is similar to the reactor used in example 1. Then, mixed gas, which was obtained by mixing isopropyl alcohol, oxygen and helium so that the molar ratio became 1:1:6.25, was passed through the reactor at a speed of 64 ml/min. The reaction conditions were normal pressure and a temperature of 140° C.

The mixed gas, which had passed through the reactor for 15 minutes immediately after the start of the reaction, was sampled, and products were analyzed by gas chromatography. As a result, conversion of the isopropyl alcohol was 30.7%. Moreover, the selectivity of propylene, diisopropyl ether and acetone, which are products, was respectively 33.4%, 40.5% and 26.2%.

EXAMPLE 7

The polyvanadic acid sol of example 1 was diluted with water, and 2.5 liters of a liquid whose concentration as vanadium ion was 0.03 mol/L was obtained. 300 mL of water, in which 19.23 g of $Mg(NO_3)_2 \cdot 6H_2O$ was dissolved, was added to the liquid, and it was agitated at room temperature for 1 hour. After a created brown precipitate was filtered, and agitation and rinsing of the it precipitate for 30 minutes using 2 liters of water were repeated twice, the precipitate was dried at 200° C. Then, after the precipitate was ground for 10 minutes by a ball mill and the resultant powder was press molded, its grain size was made uniform to 9 mesh-16 mesh so that a solid acid-base catalyst was obtained.

As to the solid acid-base catalyst obtained in the above manner, when its X-ray diffraction spectrum was measured, it was confirmed that its diffraction pattern was completely the same as the diffraction pattern of the vanadium pentoxide hydrate which was obtained in example 1 and shown in FIG. 1 and that its layer crystal structure was maintained. Moreover, it was confirmed that a peak position of the X-ray diffraction spectrum of the solid acid-base catalyst was shifted from the peak position of the X-ray diffraction spectrum of the vanadium pentoxide hydrate, which was obtained in example 1 and shown in FIG. 1, and that the interlayer spacing of the layer crystal structure was changed to 13.4 Å. As a result, it was confirmed that the $Mg^{2+}$ was intercalated between the layers of the vanadium pentoxide hydrate having the layer crystal structure. As a result of elementary analysis, the molar ratio of the intercalated $Mg^{2+}$ was 3.88 with respect to V.

Next, the dehydration and dehydrogenation reactions of isopropyl alcohol were conducted in the presence of oxygen by using the solid acid-base catalyst.

Namely, 1.0 g of the solid acid-base catalyst was charged into a reactor which is similar to the reactor used in example 1. Then, a mixed gas, which was obtained by mixing isopropyl alcohol, oxygen and helium so that the molar ratio became 1:1:6.25, was passed through the reactor at a speed of 64 ml/min. The reaction conditions were normal pressure and a temperature of 140° C.

The mixed gas, which had passed through the reactor for 15 minutes immediately after the start of the reaction, was sampled, and products were analyzed by gas chromatography. As a result, conversion of the isopropyl alcohol was 39.2%. Moreover, the selectivity of propylene, diisopropyl ether and acetone, which are products, was respectively 39.9%, 40.1% and 16.7%.

EXAMPLE 8

The polyvanadic acid sol of example 1 was diluted with water, and 2.5 liters of a liquid whose concentration as vanadium ion was 0.03 mol/L was obtained. 300 mL of water, in which 17.71 g of $Ca(NO_3)_2 \cdot 4H_2O$ was dissolved, was added to the liquid, and it was agitated at room temperature for 1 hour. After a created brown precipitate was filtered, and agitation and rinsing of the precipitate for 30 minutes using 2 liters of water were repeated twice, the precipitate was dried at 200° C. Then, after the precipitate was ground for 10 minutes by a ball mill and the resultant powder was press molded, its grain size was made uniform to 9 mesh-16 mesh so that a solid acid-base catalyst was obtained.

As to the solid acid-base catalyst obtained in the above manner, when its X-ray diffraction spectrum was measured, it was confirmed that its diffraction pattern was completely the same as the diffraction pattern of the vanadium pentoxide hydrate which was obtained in example 1 and shown in FIG. 1 and that its layer crystal structure was maintained. Moreover, it was confirmed that a peak position of the X-ray diffraction spectrum of the solid acid-base catalyst was shifted from the peak position of the X-ray diffraction spectrum of the vanadium pentoxide hydrate, which was obtained in example 1 and shown in FIG. 1, and that the interlayer spacing of the layer crystal structure was changed to 12.9 Å. As a result, it was confirmed that $Ca^{2+}$ was intercalated between the layers of the vanadium pentoxide hydrate having the layer crystal structure. As a result of elementary analysis, the molar ratio of the intercalated $Ca^{2+}$ was 0.65 with respect to V.

Next, dehydration and dehydrogenation reactions of isopropyl alcohol were conducted in the presence of oxygen by using the solid acid-base catalyst.

Namely, 1.0 g of the solid acid-base catalyst was charged into a reactor which is similar to the reactor used in example 1. Then, a mixed gas, which was obtained by mixing isopropyl alcohol, oxygen and helium so that the molar ratio became 1:1:6.25, was passed through the reactor at a speed of 64 ml/min. The reaction a conditions were normal pressure and a temperature of 140° C.

The mixed gas, which had passed through the reactor for 15 minutes immediately after the start of the reaction, was sampled, and products were analyzed by gas chromatography. As a result, conversion of the isopropyl alcohol was 30.9%. Moreover, the selectivity of propylene, diisopropyl ether and acetone, which are products, was respectively 46.6%, 32.5% and 20.9%.

EXAMPLE 9

The polyvanadic acid sol of example 1 was diluted with water, and 2.5 liters of a liquid whose concentration as vanadium ion was 0.03 mol/L was obtained. 300 mL of water, in which 28.13 g of $Al(NO_3)_3 \cdot 9H_2O$ was dissolved, was added to the liquid, and it was agitated at room temperature for 1 hour. After a created brown precipitate was filtered, and agitation and rinsing of the precipitate for 30 minutes using 2 liters of water were repeated twice, the precipitate was dried at 200° C. Then, after the precipitate was ground for 10 minutes by a ball mill and the resultant powder was press molded, its grain size was made uniform to 9 mesh-16 mesh so that a solid acid-base catalyst was obtained.

As to the solid acid-base catalyst obtained in the above manner, when its X-ray diffraction spectrum was measured, it was confirmed that its diffraction pattern was completely the same as the diffraction pattern of the vanadium pentoxide hydrate which was obtained in example 1 and shown in FIG. 1 and that its layer crystal structure was maintained. Moreover, it was confirmed that a peak position of the X-ray diffraction spectrum of the solid acid-base catalyst was shifted from the peak position of the X-ray diffraction spectrum of the vanadium pentoxide hydrate, which was obtained in example 1 and shown in FIG. 1, and that the interlayer spacing of the layer crystal structure was changed to 13.6 Å. As a result, it was confirmed that the $Al^{3+}$ was intercalated between the layers of the vanadium pentoxide hydrate having the layer crystal structure. As a result of elementary analysis, the molar ratio of the intercalated $Al^{3+}$ was 3.52 with respect to V.

Next, dehydration and dehydrogenation reactions of isopropyl alcohol were conducted in the presence of oxygen by using the solid acid-base catalyst.

Namely, 1.0 g of the solid acid-base catalyst was charged into a reactor which is similar to the reactor used in example 1. Then, a mixed gas, which was obtained by mixing isopropyl alcohol, oxygen and helium so that the molar ratio became 1:1:6.25, was passed through the reactor at a speed of 64 ml/min. The reaction conditions were normal pressure and a temperature of 140° C.

The mixed gas, which had passed through the reactor for 15 minutes immediately after the start of the reaction, was sampled, and products were analyzed by gas chromatography. As a result, conversion of the isopropyl alcohol was 35.3%. Moreover, the selectivity of propylene, diisopropyl ether and acetone, which are products, was respectively 40.7%, 38.5% and 16.5%.

The results of content of the intercalant (molar ratio) and interlayer spacings of the layer crystal structures in the solid acid-base catalysts obtained in examples 2 through 9 are shown in TABLE 1.

TABLE 1

|  | Intercalant | Intercalant/V (molar ratio) | Interlayer spacing of layer crystal structure (Å) |
| --- | --- | --- | --- |
| Example 2 | — | — | 11.5 |
| Example 3 | Pyridine | 0.61 | 13.0 |
| Example 4 | $Cu^{2+}$ | 0.59 | 11.3 |
| Example 5 | $Na^+$ | 1.24 | 11.1 |
| Example 6 | $K^+$ | 0.41 | 10.9 |
| Example 7 | $Mg^{2+}$ | 3.88 | 13.4 |
| Example 8 | $Ca^{2+}$ | 0.65 | 12.9 |
| Example 9 | $Al^{3+}$ | 3.52 | 13.6 |

The results of the dehydration and dehydrogenation reactions of the isopropyl alcohol in the presence of oxygen using the solid acid-base catalyst obtained in examples 2 through 9 are shown in TABLE 2.

TABLE 2

|  | Conversion (%) | Selectivity (%) | | |
| --- | --- | --- | --- | --- |
| Intercalant | Isopropyl alcohol | Propylene ether | Isopropyl ether | Acetone |
| Example 2 — | 37.5 | 51.1 | 32.2 | 14.5 |
| Example 3 Pyridine | 55.4 | 39.6 | — | 44.4 |
| Example 4 $Cu^{2+}$ | 50.7 | 49.6 | 28.8 | 15.2 |
| Example 5 $Na^+$ | 21.1 | 44.1 | 33.6 | 17.8 |
| Example 6 $K^+$ | 30.7 | 33.4 | 40.5 | 26.2 |
| Example 7 $Mg^{2+}$ | 39.2 | 39.9 | 40.1 | 16.7 |
| Example 8 $Ca^{2+}$ | 30.9 | 46.4 | 32.5 | 20.9 |
| Example 9 $Al^{3+}$ | 35.3 | 40.7 | 38.5 | 16.5 |

The invention being thus described, it will be apparent that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of catalyzing a gas phase reaction of an organic compound comprising contacting a gas containing an organic compound with a solid acid-base catalyst which is an unbridged vanadium pentoxide hydrate having the formula $V_2O_5 \cdot nH_2O$, where n is 0.1 to 3.

2. The method of claim 1, wherein said gas phase reaction is selected from the group consisting of dehydration, dehydrogenation, isomerization, alkylation, esterification, amidation, acetalization, amination, a hydrogen shift reaction, aldol condensation and polymerization.

3. The method of claim 2, wherein the organic substance is a compound containing nitrogen.

4. The method of claim 1, wherein said vanadium pentoxide hydrate is obtained by polycondensing and drying a solution obtained by ion-exchanging a vanadate aqueous solution using a proton-type cation exchange resin.

5. The method of claim 1, wherein said vanadium pentoxide hydrate is obtained by adding mineral acid to a vanadate aqueous solution.

6. The method of claim 1, wherein said vanadium pentoxide hydrate is obtained by hydrolyzing vanadyl alkoxide.

7. A process for catalyzing a gas phase reaction of an organic compound, comprising the step of:

contacting a gas including an organic compound with a solid acid-base catalyst, wherein the solid acid-base catalyst is composed of vanadium pentoxide hydrate having a layered structure, and at least one substance selected from the group consisting of (1) a metal ion selected from the group consisting of $Li^+$, $Na^+$, $K^+$, $Ca^2$, $Mg^{2+}$, $Al^{3+}$, $Cu^{2+}$, $Ag^+$, $Ni^{2+}$, $Co^{3+}$, $Fe^{3+}$ and $La^{3+}$ and (2) an ammonium ion represented by the formula $R^1R^2R^3R^4N^+$, where $R^1, R^2, R^3$, $R^4$ each independently represent hydrogen or an alkyl group, which is intercalated between layers of the vanadium pentoxide hydrate.

8. A process for catalyzing a gas phase reaction of an uncharged organic compound, comprising the step of:

contacting a gas including an organic compound with a solid acid-base catalyst, wherein the solid acid-base catalyst is composed of vanadium pentoxide hydrate having a layered structure, and an uncharged organic compound which is intercalated between layers of vanadium pentoxide hydrate.

* * * * *